Sept. 17, 1940.　　　D. D. ROGERS　　　2,214,777
MOWER DRIVING HEAD
Filed Sept. 21, 1938　　　2 Sheets-Sheet 1
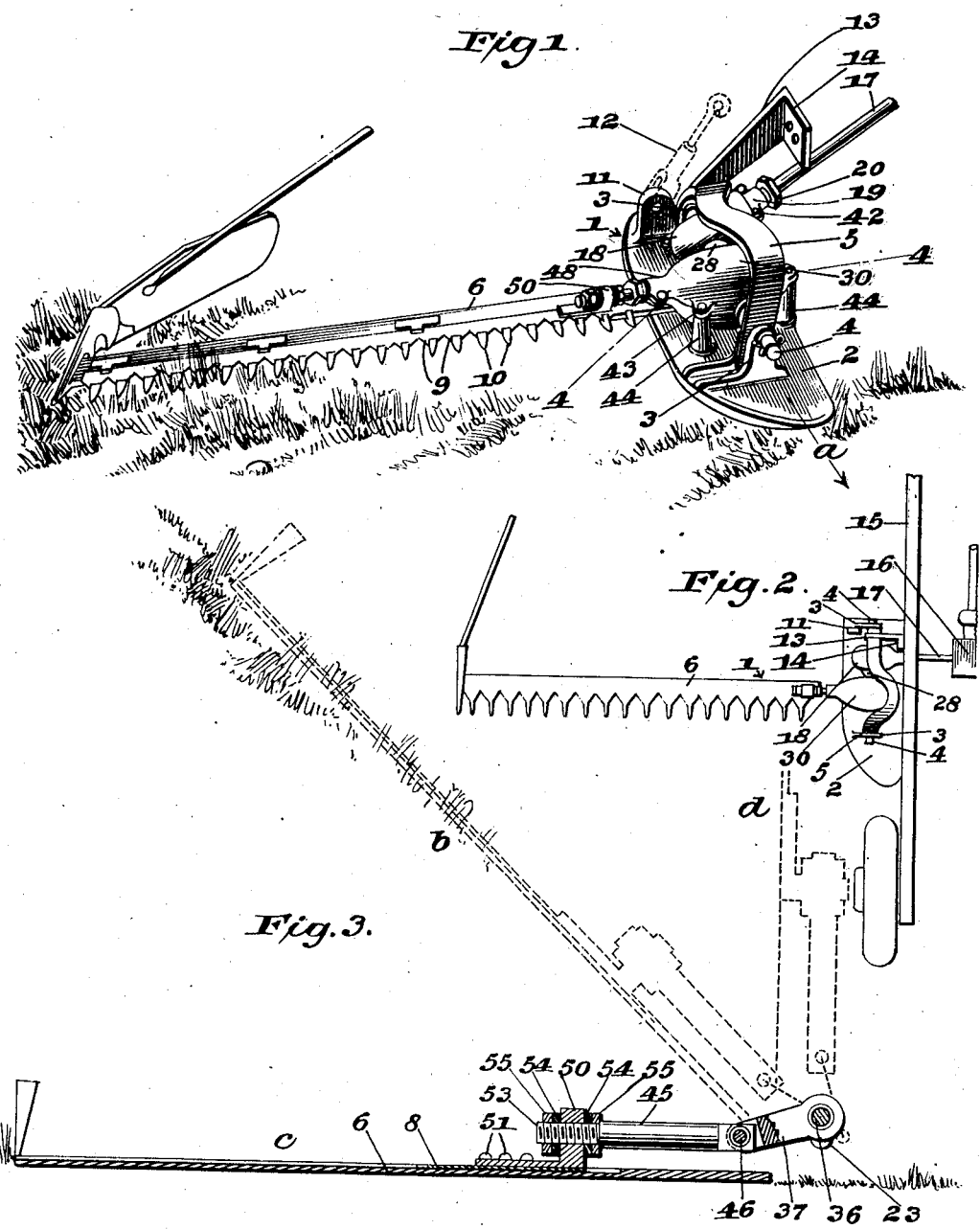
INVENTOR
Daniel D. Rogers.
BY
Munn, Anderson & Liddy
ATTORNEY Sept. 17, 1940.　　　　D. D. ROGERS　　　　2,214,777
MOWER DRIVING HEAD
Filed Sept. 21, 1938　　　2 Sheets-Sheet 2
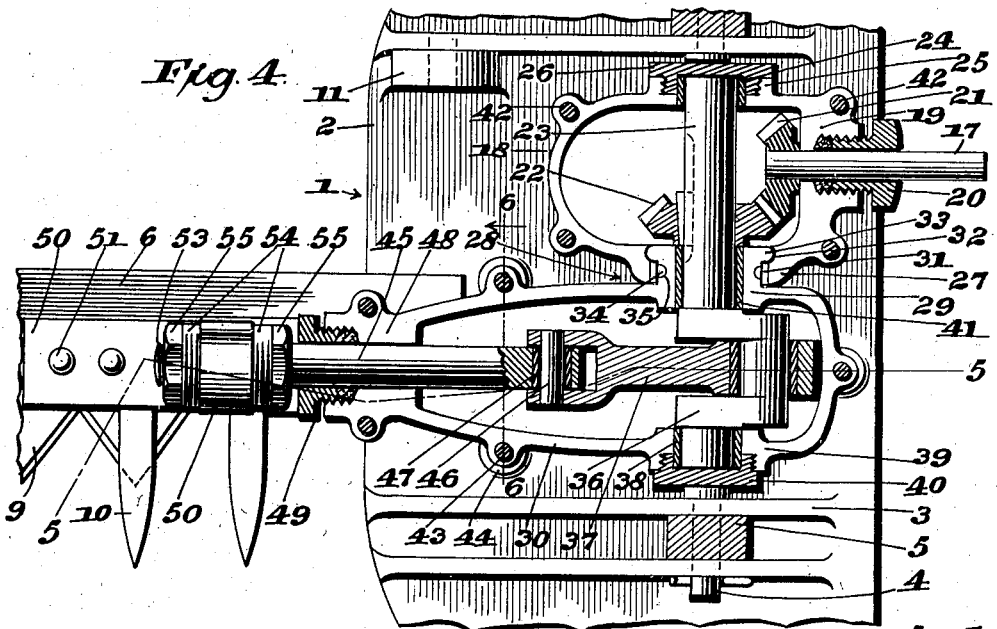
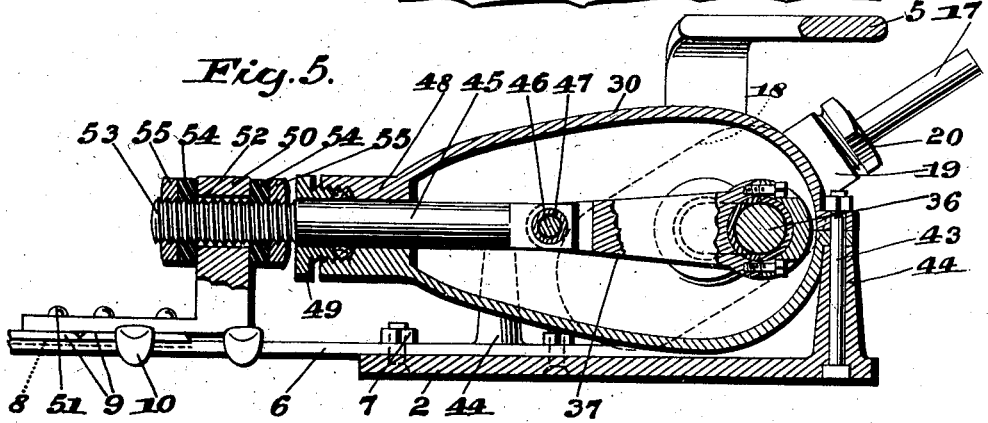
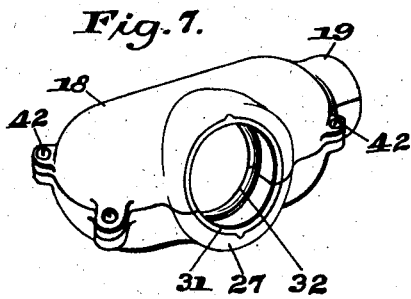
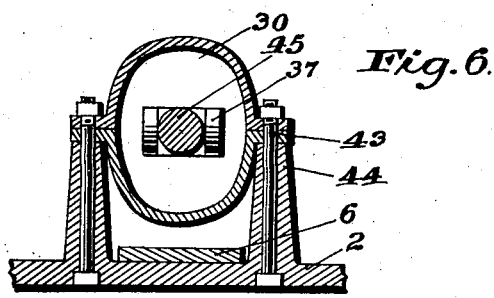
INVENTOR
Daniel D. Rogers
BY
Munn, Anderson & Liddy
ATTORNEY Patented Sept. 17, 1940

2,214,777

UNITED STATES PATENT OFFICE 2,214,777

MOWER DRIVING HEAD

Daniel D. Rogers, Columbia, S. C., assignor, by direct and mesne assignments, to Mower Driving Corporation, Columbia, S. C., a corporation of South Carolina Application September 21, 1938, Serial No. 231,041

2 Claims. (Cl. 56—264)

This invention relates to improvements in mowers. As is commonly known, agricultural implements of this type are customarily of a fairly complex construction. The ordinary mower as used in farm work, comprises a wheeled vehicle wherein the traction afforded by at least one of the wheels constitutes the source of driving power for the sickle blades.

This circumstance naturally makes the machine fairly complex as already suggested, embodying in it an assemblage of power transmitting parts, braces, supports and the like, all requiring a degree of maintenance and figuring in the ultimate high cost of the implement.

It is herein proposed to provide not only a simplified mower and one which can be made and marketed at a proportionately low cost, but fundamentally a mower which is made in the form of a self-contained unit that can be sold as such, and has only to be attached to a conveyance with a suitable source of power, whereupon the user will have every advantage of a complete mower customarily identified under that name. With this preamble in mind the objects of the invention are as follows:

First, to provide a mower wherein the cutter bar and its immediately carried parts are adapted to be swung into a cutting position at any point within a 90° arc from the horizontal plane.

Second, to provide a mower unit which comprises a self-contained, operative mechanism adapted to be attached to any suitable type of movable support such as a truck or wagon, and adapted to be driven by an appropriate source of power carried by its conveyance.

Third, to provide a mower wherein the sickle head is equipped with rubber abutments at each of its two sides for the purpose of relieving the device of dangerous shocks in the event that the sickle blades should cut into particularly heavy brush.

Fourth, to provide a mower unit wherein the sickle bar is reciprocated by a piston type shaft, said shaft being directly driven by a crank, this arrangement enabling setting the cutter bar at any pitch within the limits denoted, and to assure a perfectly smooth and effective operation at any setting.

Fifth, to provide an improved swivel connection between the crank and gear cases.

Other objects and advantages will appear in the following specification, reference being had to the accompanying drawings, in which:

Figure 1 is a perspective view of the improved mower unit.

Figure 2 is a detail plan view illustrating its attachment to the chassis of a truck, the transmission of which is adapted to provide the source of driving power.

Figure 3 is a sectional diagram illustrating how the cutter bar can be stood in any position within a 90° arc and yet be wholly operative.

Figure 4 is a detail horizontal section taken substantially on the line 4—4 of Fig. 1.

Figure 5 is a detail vertical section taken substantially on the line 5—5 of Fig. 4.

Figure 6 is a cross section taken on the line 6—6 of Fig. 4.

Figure 7 is a detail perspective view of the gear case.

The improved mower unit is generally designated 1. This unit embodies some features which, necessarily, are well known in the art. These features are briefly described as follows: a shoe 2 has pairs of lugs 3 which provide places for the mounting of studs 4 to which the yoke 5 is pivotally connected.

The shoe 2 has the cutter bar 6 rigidly secured to it at 7 (Fig. 5). This cutter bar has provision for slidably guiding the sickle bar 8 (Fig. 5). This bar has a plurality of sickle blades 9 riveted to it, and when the sickle bar is reciprocated a cutting action takes place because of their interaction with the prongs 10. The shoe 2 also has an upstanding lug 11 for the attachment of any known kind of lifting means 12 (Fig. 1). As the unit 1 is moved forwardly over the ground surface (arrow a, Fig. 1) the sickle blades 9 perform their cutting action. Ordinarily the shoe 2 and cutter bar 6 are subject to being tilted with respect to the horizontal plane. Ordinary types of driving means for the sickle bar impose that limitation upon said tilting, confining the cutter bar to adjustments within approximately 30° from the horizontal plane.

The improvements to known mowers, embodied in the invention, are as follows: a bracket 13 (Fig. 1) is rigidly secured to the yoke 5. This bracket may be of any desired type, but it includes a flange 14 with holes through which bolts may be inserted for the fastening of the bracket to some firm support. One suggested mode of conveying the unit 1 is to affix the bracket 14 to the chassis 15 of a motor truck (␣Fig. 2). When this fastening is accomplished, the bracket 13 and yoke 5 virtually comprise a part of the chassis, projecting out to one side and suspending the mower unit in more or less direct contact with the adjacent ground surface.

Said truck includes a transmission 16. The case of this transmission generally has an inspection plate (not shown) which, for the purposes of the invention, is removed in order to enable making a connection of the driving shaft 17 of the mower unit with the gearing on the inside. In actual practice it may be deemed desirable to so amplify the mechanism as to enable clutching the driving shaft 17 in and out, and for ordinary purposes it will not be objectionable to have the mower unit in driving connection with the transmission at all times, so that said unit will be in operation when the truck is put in motion.

The driving shaft 17 extends into a gear case 18 (Fig. 4). The latter is intended to be filled with a volume of oil so that the gears will be constantly lubricated. This makes it desirable to provide the bearing 19 for the shaft 17 with a packing gland 20 to stop the leakage of oil. The shaft 17 carries a pinion 21. This pinion is in mesh with a driven pinion 22 on the crank shaft 23. One end of this shaft is journaled in a bronze or similar bushing 24 which is carried by the hub 25 of the gear case. A cap 26 is screwed into this hub to seal the adjacent end of the shaft against the escape of oil.

An enlargement 27 on the side of the gear case opposite to the hub 25 provides one-half of a swivel connection commonly designated 28. The other half of this connection comprises the sleeve 29 of the crank 30. The enlargement 27 is fitted with a bronze or similar bushing 31. Immediately to the inside of this bushing the enlargement 27 has a circular groove 32. The sleeve 29 has a matching circular rib 33. The rib and groove provide a turnable connection which, while allowing the necessary turning motion of the shoe 2 and its carried parts in respect to the gear case 18, prevents the two cases from inadvertently separating the slightest extent, thus affording an oil seal.

This oil seal is augmented by a packing 34 which is fitted in a circular groove 35 in the sleeve 29. This packing confronts the bushing 31 and tends to stop the escape of oil. A crank 36, which is integral with the shaft 23, turns in the case 30 and drives the rod 37 which is connected to it. The shaft 23 extends beyond the crank and is journaled in a bronze or similar bushing 38 in the hub 39 of the crank case 30.

A cap 40 is screwed into this hub and serves to stop the leakage of oil. A bushing 41, similar to the two already mentioned, is fitted in the sleeve 29 and provides a central bearing for the crank shaft. The latter, therefore, has a three-point suspension which serves to give it adequate support and to insure smooth operation.

At this point it is to be noted that the gear and crank cases 18 and 30 are made in halves as shown in the instance of the crank case 30 in Fig. 6. This construction is chiefly necessary to enable the assemblage of the swivel connection 27, 28, 29. In assembling the halves the packing 34 will be emplaced in the groove 35 in sections. The various bushings will ordinarily be made in halves and fitted tightly in the respective hubs 25, 39, and sleeve 29. The halves of the gear case 18 are simply bolted together at 42, but the bolts 43 which secure the halves of the crank case 30 are long enough (Fig. 5) to reach down and include the shoe 2. The latter has upstanding lugs 44 upon which the crank case 30 is rigidly mounted when the nuts are screwed home on the bolts. The crank case 30 is thus, virtually, an integral part of the shoe 2.

When the cutter bar 6 and shoe 2 are adjusted to any desired slope within a 90° arc (Fig. 3) the turning is done on the studs 4. It is to be observed in Figs. 1 and 4 that these studs are centered on the crank shaft 23. Said crank shaft and studs 4 are thus on a common axis. Turning of the shoe and cutter bar therefor does not disturb the particular setting of the gear case 18, the latter ordinarily standing approximately at a pitch of 45° which is necessary for the drive shaft 17 to reach the transmission case 16. By reference to Fig. 3 it is seen that the cutter bar 6 may operate in the 45° position $b$ equally as well as in the level position $c$. It is even conceivable that the cutter bar will operate in the erect position $d$. Regardless of what the position of the cutter bar may be within the 90° arc, it will be possible to operate the sickle blades 9 with perfect smoothness because of the manner of driving the sickle bar.

This drive comprises a shaft 45 (Figs. 4 and 5) which is connected to the rod 37 by a wrist pin 46. Said shaft is fitted with a bushing 47 in which the wrist pin turns. The shaft 45 is rectilinearly guided in its reciprocation by a fairly long bearing 48 at one terminal of the crank case 30. This crank case also has a filling of oil, and a packing gland 49 is fitted in the bearing 48 to prevent oil leakage around the shaft.

Considerable importance is attached to the mode of connection of the shaft 45 to the sickle bar 8. The latter has a sickle head 50 riveted or otherwise secured to it at 51. The head has a smooth hole 52 which is large enough to receive the threaded end 53 of the shaft 45.

Rubber or similar resilient abutments 54 are fitted on the end 53 at respective sides of the head 50. Nuts 55 are screwed onto the end 53 so as to back up the abutments 54. These nuts are intended to be tightened to that degree which will hold the abutments at the desired degrees of compression. Thereafter the nuts will be set in any known way, for example, by drilling holes through the nuts and shaft end and then inserting pins.

The particular purpose of the rubber abutments 54 is to absorb unusual shocks which occur when the blades 9 encounter some particularly stubborn material. The blades will cut through but it is desired to prevent all of the shock from reaching the mechanism on the inside of the case 30. The rubber abutments 54 accomplish this purpose.

In the operation of the mower unit the turning of the shoe 2 and cutter bar 6 occurs on the common axis of the studs 4 and crank shaft 23. As the latter is revolved by the gearing in Fig. 4, the crank 36 drives the connecting rod 37 and reciprocates the shaft 45. The resulting piston motion vibrates the sickle bar 8 rapidly and it is easily seen that this characteristic motion cannot be interrupted or interfered with at any standing position of the cutter bar within the limits depicted in Fig. 3.

It will be understood from the foregoing description that the improvement rests primarily in what is aptly called the driving head for the cutter bar 6. This driving head essentially comprises the gearing in Fig. 4, and the means for transmitting the driving power which it represents to the sickle bar 8 by a reciprocatory motion. Although the yoke 5 is necessary for the suspension of the driving head particular emphasis is laid upon the driving head itself.

I claim:

1. A driving head comprising a shoe having cutter means extending therefrom, a case rigidly mounted on the shoe, a crank shaft operable in said case, means to journal the crank shaft, including a sleeve extending from the case and having a rib, a driving connection between the crank shaft and said cutter means, driving means for the crank shaft, a case enclosing said driving means, and an enlargement on said case into which the sleeve is extended, thereby containing the sleeve and having a groove in which the rib is turnably fitted to provide an axially inseparable coupling for the cases and a swivel connection for the swinging of the shoe in respect to the driving means and its case.

2. A driving head comprising a shoe, a case rigidly mounted on the shoe, cutter means carried by and extending from the shoe, said case having a bearing in line with and overlying a portion of the cutter means, a shaft slidably supported by said bearing and consequently parallel to said cutter means, means providing a resilient connection and coupling between the outer end of the shaft and an operative portion of the cutter means, a crank shaft journaled crosswise of said case and revoluble crosswise of said cutter means, said shaft having a connecting rod operable in a vertical plane parallel to the cutter means, said connecting rod joining the shaft for the reciprocation of the shaft, driving means for the crank shaft, a case for the driving means, being loosely mounted upon the crank shaft, and means for turnably connecting the case of the driving means with the rigid case, permitting relative turning in said vertical plane by a swinging of the shoe for the raising and lowering of the cutting means.

DANIEL D. ROGERS.